United States Patent [19]

Shenk

[11] 4,263,093

[45] Apr. 21, 1981

[54] METHOD FOR RETAINING TEXTURED SURFACE OF PRESSED CEILING BOARD

[75] Inventor: Jay D. Shenk, Lancaster, Pa.

[73] Assignee: Armstrong Cork Company, Lancaster, Pa.

[21] Appl. No.: 77,305

[22] Filed: Sep. 20, 1979

[51] Int. Cl.³ .............................................. D21H 5/02
[52] U.S. Cl. ................................... 162/109; 162/222; 162/225; 264/119
[58] Field of Search .................... 156/62.2, 323, 583.3; 264/109, 112, 113, 119, 120, 313; 425/403, 383, 389, 387.1, 405 H, 405 R; 162/205, 210, 223, 224, 225, 226, 108, 115, 222; 100/211

[56] References Cited

U.S. PATENT DOCUMENTS

| 2,268,262 | 12/1941 | Miller | 156/583.3 |
| 2,431,720 | 12/1947 | Willey | 156/289 |
| 2,445,210 | 7/1948 | Colton | 264/113 |
| 3,639,200 | 2/1972 | Elmendorf | 156/62.2 |

Primary Examiner—Michael W. Ball

[57] ABSTRACT

A low-cost mineral-fiber board having a natural-appearing highly textured surface, and improved uniformity of density is produced by coating the wet-textured surface of a perlite-containing mineral-fiber mat to a depth at least equal to the peak height of the texture with a layer of silicone-coated perlite prior to press-forming the board. The perlite layer fills the voids on the textured surface and provides a buffer layer between the board and press roll, enabling uniform pressure to be applied to the board without disturbing the textured surface. The top perlite layer may be removed by vacuum units before or after drying the board.

3 Claims, 3 Drawing Figures

U.S. Patent     Apr. 21, 1981     4,263,093
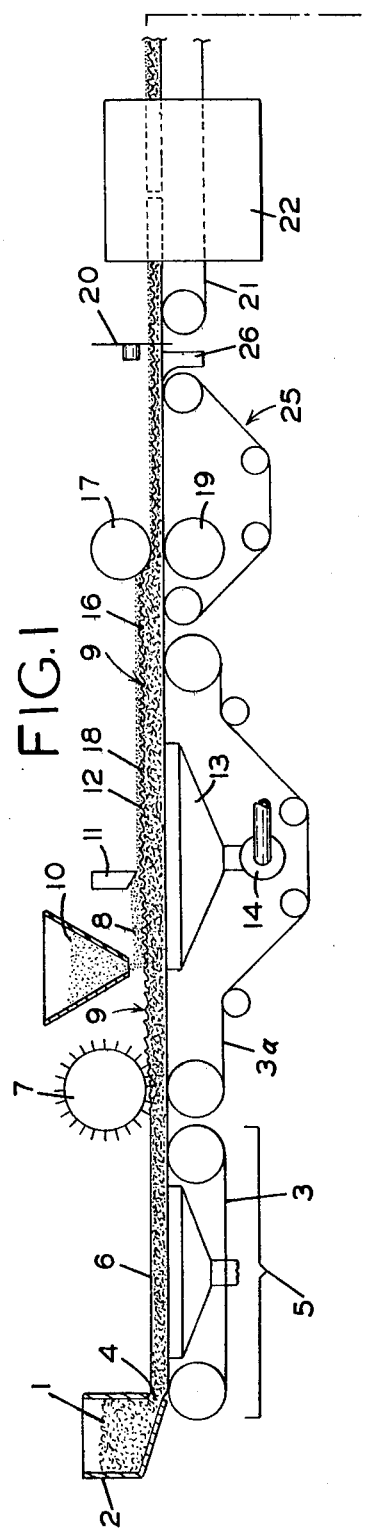
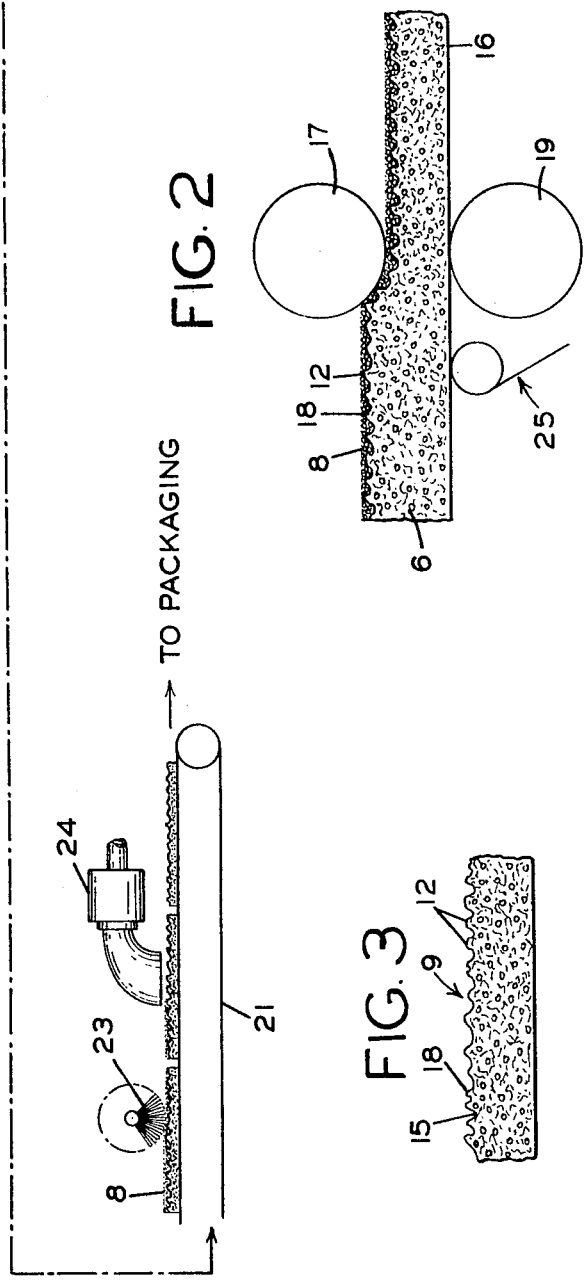

METHOD FOR RETAINING TEXTURED SURFACE OF PRESSED CEILING BOARD

BACKGROUND OF THE INVENTION

This invention relates to a method for forming a fibrous board having a randomly textured surface. More particularly, the invention relates to a method for forming such a board, texturing it while in the wet state and preserving the texturing during a subsequent pressing operation through the use of a buffering layer of silicone-coated perlite.

DESCRIPTION OF THE PRIOR ART

It has previously been known to produce mineral fiber acoustical boards by incorporating a small amount of expanded perlite (usually 25% or less by weight) in a mineral-fiber slurry on a moving wire screen of a Fourdrinier or cylinder machine. The expanded perlite is primarily used as a bulking agent to reduce the density of the mineral-fiber boards. One method of producing highly textured surfaces on such boards is by disturbing the wet mat with tampers, brushes, or needle rolls.

Many variations of board compositions, which are basically perlite, mineral wool, cellulose fiber, starch, and a glass fiber, have been found to produce the desired texture in the wet state. However, these compositions with high levels of perlite and low levels of fibrous material must be pressed to achieve sufficient wet strength for transporting and drying. Such pressing normally has an adverse effect on the texturing because the upper regions of the ridges are poorly bound and are easily flattened or destroyed by normal pressing methods.

Compositions with a high level of fibrous materials and lower levels of perlite have adequate wet strength but are undesirable because of higher costs, high flame spread, or poorer physical properties of the finished product.

U.S. Pat. No. 3,639,200-Elmendorf et al. relates to a textured wood panel which may be formed by pressing a layer of binder coated ligno-cellulosic particles in a hot plate press with a cushioning material used between the metal cauls of the press and the board. The cushioning material may comprise the use of a silicone rubber cushion on either one or both sides of the panel. In place of the rubber cushion, the combination of a thin membrane or release sheet and a cushion of fine sawdust or other compressible waste material may be used. Equalization of pressure on the board through the use of the cushioning material results in a textured surface on the board caused by the differences in compressibility of certain portions thereof.

U.S. Pat. No. 2,431,720 relates to a method of making pressed ligno-cellulosic products having pebbly or varying decorative surfaces. In this process, two planks are pressed together with an intermediate or intervening material therebetween which will not adhere to the planks. The intervening material has a rough surface which is harder than the plank material and causes indentations to be formed therein. The intervening material may be in particulate form, and the excess may be removed after pressing.

U.S. Pat. No. 2,445,210 relates to the manufacture of fibro-cementitious sheets wherein a thin parting layer of dry mineral particles or grains is used between moistened fibro-cementitious sheets. After pressing, the sheets are parted by splitting any cured composite segments along the plane of the parting layer into two shingles or siding sheets, each having an irregular textured finish.

SUMMARY OF THE INVENTION

This invention relates to a method for forming low-cost mineral-fiber board of improved uniform density and having a highly textured surface. The invention, more particularly, relates to a method of forming such boards wherein the highly textured surface is produced on such boards while still in wet mat form, and this textured surface is preserved during the pressing operation by coating the textured surface of the wet mat with silicone-coated perlite to a depth equal to the peak height of the texture. The perlite serves as a void-filling buffer layer between the press and the board and preserves the texturing thereon. After pressing, the perlite can be removed by vacuum before or after drying the board.

Many advantages accrue from the present invention because it allows the use of a higher percentage by weight of perlite in the board and allows pressing thereof to achieve sufficient wet strength for transporting and drying without destroyed the textured surface of the board. Further, the cost of the boards is reduced because high levels of fibrous materials are not required to provide the wet-strength of the mat from which the board is formed to enable it to be transported and dried. From the standpoint of economics, the cost of mineral fibers, such as mineral wool, is at least three to four times greater than the cost of expanded perlite aggregate on an equal weight basis.

Another advantage of the present invention is that the improved board produced thereby is produced without altering the density of the board in a nonuniform manner, as is the case where the board is normally pressed and the higher elevations of the textured surface are flattened and compressed. This is important because acoustical boards should have uniform optimum sound-absorbing properties and a desirable noise reduction coefficient. Acoustical boards must also have a porous structure for entrapping and absorbing soundwaves. This porous structure is affected to a large degree by the amount of compression to which the board is subjected during the wet-forming operation. When the wet mat from which the board is formed in textured by providing high and low places, or peaks and valleys, and then pressed in a normal manner, the board becomes more dense in the compressed peak areas than in the valley locations, resulting in nonuniform density of the board.

Through the use of the present invention, the buffer layer of silicone-coated perlite distributes the force exerted by the pressing operation evenly over all of the contour of the textured surface of the wet mat so that sufficient pressure required to form the desired product may be used without overly compacting the board in the areas of higher elevation of the textured surface, and undercompacting the board in the lower elevations thereof. Therefore, this invention provides a solution to the previously existing problem of how to increase the wet strength of the board at a low cost without destroying the textured surface, and yet obtain a product having the desired physical properties.

BRIEF DESCRIPTION OF THE DRAWINGS

FIG. 1 is a diagrammatic view showing the apparatus and method steps used in carrying out the present invention.

FIG. 2 is a side view of a perlite-coated textured board being pressed.

FIG. 3 is a side view of a portion of the final product.

DESCRIPTION OF THE PREFERRED EMBODIMENTS

In accordance with the method of this invention, a slurry consisting of about 4% to 60% dry weight of expanded perlite particles, and about 24% to 91% of fibers usually of the mineral wool and cellulosic type, and a binding agent such as starch, 4% to 11%, dry basis is formed. The slurry is formulated at a solids content of about 3% to 8%.

As shown in FIG. 1 of the drawings, a slurried composition of perlite particles and fibers 1 is pumped into a head box 2.

A typical formula for formation of the board of this invention is as follows:

| Ingredient | Typical (%) | Range (%) |
|---|---|---|
| Mineral Wool | 24.07 | 9.43–71.61 |
| Newsprint | 19.18 | 14.56–19.18 |
| Starch | 10.52 | 4.00–10.52 |
| Perlite (3 to 6 lbs./ft.$^3$) | 45.87 | 4.00–60.00 |
| Clay | 0.00 | 0.00–7.58 |
| Aluminum Sulfate | 0.27 | 0.22–0.38 |
| Flocculent | 0.06 | 0.01–0.06 |
| Defoamer | 0.03 | 0.00–0.03 |
| Glass Fiber | 0.00 | 0.00–0.55 |
| Total | 100.00 | |

The slurried composition 1 is then deposited onto Fourdrinier wire 3 through orifice 4 of the head box 2. As the mix passes over the drainage section 5 of the Fourdrinier wire 3, it drains to about an 18% solids content. The normal range of the solids content at this point is from about 15% to 25%.

The wet mat 6 then passes from the drainage section 5 of the Fourdrinier wire 3 beneath a texturing element which is shown in FIG. 1 as being a needle roll 7. A layer of silicone-coated perlite particles 8 is then deposited onto the textured surface 9 of the wet layer 6 from a container 10. The layer of silicone-coated perlite particles 8 is then carried by Fourdrinier wire 3a beneath screeding member 11 and screeded to a level at least even with the tips 12 of the peaks 18 of the textured surface 9 of the wet mat 6 and further drainage of water from the mat 6 is promoted by suction box 13 with vacuum pump 14.

In this embodiment of the invention, the needle roll 7 used for the texturing was 12 inches in diameter and 30 inches wide with a pin density of about 15 pins/inch squared. The thickness of the mat 6, at this point, was 1.88 inches, and the pins penetrated the mat 6 about 1.3 inches forming hills or peaks 18 and voids or valleys 15 (see FIG. 3) about 0.10 inch to 0.300 inch deep. Obviously, other means could be used to texture the mat such as brushes or tampers.

The layer of perlite 8 fills all of the voids or valleys 15 on the textured surface and is equal in thickness to at least the highest point or tip 12 of the textured surface 9.

As most clearly shown in FIG. 2 of the drawings, the mat 6 with the layer 8 of silicone-coated perlite particles is then carried by conveyor belt 25 between press rolls 17 and 19 and the layer 8 of perlite particles provides a buffer layer between the board 16 and the press roll 17. The buffering layer 8 of perlite allows the board 16 to be pressed without disturbing its surface texture or creating variations in its density which would normally occur if the buffering layer 8 of perlite particles was not used. Without the use of the buffering layer 8, the peaks 18 of the board 16, which of course, contain more material than the valleys 15 would be compacted to the same level as the valleys 15 creating density variations in the board. The elimination of this problem and the preservation of the textured surface of the board during pressing thereof are the primary improvements in this invention.

The silicone-coated perlite applied to the wet mat was cement grade perlite with a typical screen analysis as follows:

| U. S. Sieve No. | Percent Retained |
|---|---|
| 7 | 1.76 |
| 14 | 33.8 |
| 20 | 34.4 |
| 30 | 9.7 |
| 50 | 8.8 |
| 100 | 5.3 |
| 10 | 6.1 |
| | 99.9 |

It is preferred to use larger size aggregate to reduce dust and facilitate subsequent removal. Although silicone-coated perlite particles are preferred for use as the buffering layer 8, glass beads, or cork particles could also be used for the same purpose. However, drying temperatures are limited to about 350° F. when cork is used. The solids content of the wet mat, after passing the suction box 13, is about 24%.

The perlite covered wet mat after passing through press rolls 17 and 19 was pressed and thickness reduced approximately 0.250 inch to 0.400 inch. Essentially, no more water was removed during this pressing step.

The wet perlite-coated board 16 was passed over a support element 26 and cut by means of saw 20 into pieces measuring 24 inches by 50 inches. These pieces were then conveyed by a means of conveyor 21 through the dryer 22 where the board 16 was dried at a temperature of approximately 450° F. for about 2 hours.

After removal from the dryer 22, the board 16 was then passed by conveyor 21 beneath a brush 23 and a vacuum 24 to remove the layer 8 of perlite particles from the board surface and result in the product a portion of which is shown in FIG. 3 of the drawings. The layer 8 of perlite may be removed either before or after the board is dried. It is preferred that the layer 8 of perlite be removed after the drying operation to prevent formation on drying of the brown brittle surface crust typical of boards containing cellulose and starch ingredients. By removing the buffering layer 8 after the drying operation, a tougher board surface is obtained and the high cost of scuff and bleed-resistant coatings can be eliminated.

What is claimed is:

1. A method for forming a fibrous board of substantially uniform density and having a decorative, randomly textured surface, comprising
   (a) forming a water-laid mat of perlite particles and entangled fibers on a foraminous carrier;

(b) creating a decorative textured surface on said water-laid mat while it is still wet by forming voids therein having depths ranging from about 0.10 to 0.300 inch;
(c) depositing a void-filling layer of particulate material onto the textured surface of said mat;
(d) leveling the top surface of the layer of particulate material so that it is at least even with the highest elevation of the textured surface of the mat;
(e) removing a portion of the water from said mat;
(f) pressing the wet-textured mat with the layer of particulate material thereon to consolidate the mat into a board of substantially uniform density while preserving the configuration of the void-containing textured surface produced in the step of sub-paragraph (b); and
(g) in indifferent order, removing the layer of particulate material and drying the board.

2. The method according to claim 1 wherein the void-filling layer of particulate material comprises silicone-coated perlite.

3. The method according to claim 2 wherein the water-laid mat includes about 4% to 60% dry weight of expanded perlite particles, about 24% to 91% of fibers, and about 4% to 11% of a binding agent.

* * * * *